(12) United States Patent
Kuhlmann et al.

(10) Patent No.: US 9,713,915 B2
(45) Date of Patent: Jul. 25, 2017

(54) BIRD PROTECTION GLAZING

(71) Applicant: Covestro Deutschland AG, Leverkusen (DE)

(72) Inventors: Timo Kuhlmann, Leichlingen (DE); Michael Erkelenz, Duisburg (DE); Emmanuel Bral, Eeklo (BE)

(73) Assignee: Covestro Deutschland AG, Leverkusen (DE)

( * ) Notice: Subject to any disclaimer, the term of this patent is extended or adjusted under 35 U.S.C. 154(b) by 0 days.

(21) Appl. No.: 14/761,379

(22) PCT Filed: Jan. 16, 2014

(86) PCT No.: PCT/EP2014/050810
§ 371 (c)(1),
(2) Date: Jul. 16, 2015

(87) PCT Pub. No.: WO2014/111473
PCT Pub. Date: Jul. 24, 2014

(65) Prior Publication Data
US 2015/0375485 A1 Dec. 31, 2015

(30) Foreign Application Priority Data

Jan. 18, 2013 (EP) ..................................... 13151893

(51) Int. Cl.
| | | |
|---|---|---|
| B32B 3/00 | (2006.01) | |
| B32B 27/18 | (2006.01) | |
| A01M 29/08 | (2011.01) | |
| B32B 5/14 | (2006.01) | |
| B32B 27/36 | (2006.01) | |
| B23K 26/362 | (2014.01) | |
| B23K 26/40 | (2014.01) | |
| B23K 26/402 | (2014.01) | |
| B23K 103/16 | (2006.01) | |
| B23K 103/00 | (2006.01) | |

(52) U.S. Cl.
CPC ............. B32B 27/18 (2013.01); A01M 29/08 (2013.01); B23K 26/362 (2013.01); B23K 26/40 (2013.01); B23K 26/402 (2013.01); B32B 5/142 (2013.01); B32B 5/147 (2013.01); B32B 27/365 (2013.01); B23K 2203/172 (2015.10); B23K 2203/42 (2015.10); B32B 2307/412 (2013.01)

(58) Field of Classification Search
CPC ....... B32B 27/365; B32B 27/18; B32B 5/142; B32B 5/147; B32B 2307/40; B23K 26/40; B23K 26/362; B23K 2203/42; B23K 2203/172
See application file for complete search history.

(56) References Cited

U.S. PATENT DOCUMENTS

| | | |
|---|---|---|
| 4,101,513 A | 7/1978 | Fox et al. |
| 4,185,009 A | 1/1980 | Idel et al. |
| 4,395,463 A | 7/1983 | Kray |
| 4,707,393 A | 11/1987 | Vetter |
| 5,041,313 A | 8/1991 | Patel |
| 5,235,026 A | 8/1993 | Wulff et al. |
| 5,288,778 A | 2/1994 | Schmitter et al. |
| 5,367,044 A | 11/1994 | Rosenquist |
| 5,391,795 A | 2/1995 | Pickett |
| 5,821,380 A | 10/1998 | Holderbaum et al. |
| 5,846,659 A | 12/1998 | Löwer et al. |
| 5,869,185 A | 2/1999 | Bahr et al. |
| 5,883,165 A | 3/1999 | Kröhnke et al. |
| 6,228,973 B1 | 5/2001 | McCloskey et al. |
| 6,350,512 B1 | 2/2002 | Hurley et al. |
| 6,586,556 B2 | 7/2003 | Kratschmer et al. |
| 6,613,869 B1 | 9/2003 | Horn et al. |
| 7,425,358 B2 | 9/2008 | Heuer et al. |
| 7,442,430 B2 | 10/2008 | Buckel et al. |
| 7,547,755 B2 | 6/2009 | Heuer |

(Continued)

FOREIGN PATENT DOCUMENTS

| | | |
|---|---|---|
| DE | 10 31 512 B | 6/1958 |
| DE | 25 00 092 A1 | 7/1976 |

(Continued)

OTHER PUBLICATIONS

International Search Report for PCT/EP2014/050810 mailed Apr. 15, 2014.
Bosman, "Processes and Strategies for Solid State Q-Switch Laser Marking of Polymers", Thesis, University of Twente, pp. 37, 38, 160-165 (2007).
Haupt, "Auf dem Weg zu einem neuen Mythos? Warum UV-Glas zur Vermeidung von Vogelschlag noch nicht empfohlen werden kann", Berichte Zum Vogelschutz, vol. 47/48, pp. 143-160 (2011).

Primary Examiner — Elizabeth Mulvaney
(74) Attorney, Agent, or Firm — Richard P. Bender

(57) ABSTRACT

The invention relates to at least partly transparent or translucent molded plastic parts for producing noise protection walls, facade components, and glazings which ensure effective bird protection. In particular, the invention relates to molded plastic parts comprising g) at least one substrate layer (matrix/base layer) containing at least one thermoplastic polymer, wherein the substrate layer comprises a base layer and a coextrusion layer adjoining said base layer, said coextrusion layer comprising at least one IR absorber; a) optionally at least one cover layer on at least one face of the substrate layer; and b) optionally a primer or an intermediate layer between the layers a) and b). The invention is characterized in that the molded plastic part has markings in the substrate layer, said markings reducing the transparency of the molded part in the wavelength range of 380 to 780 nm in the marked regions.

16 Claims, 3 Drawing Sheets

(56) References Cited

U.S. PATENT DOCUMENTS

| | | |
|---|---|---|
| 8,044,122 B2 | 10/2011 | Ruediger et al. |
| 9,079,443 B2 | 7/2015 | Pudleiner et al. |
| 2013/0003208 A1 | 1/2013 | Alsip et al. |
| 2013/0087720 A1 | 4/2013 | Cesnik et al. |

FOREIGN PATENT DOCUMENTS

| | | |
|---|---|---|
| DE | 2804283 A1 | 8/1978 |
| DE | 3121385 A1 | 8/1982 |
| DE | 3402871 A1 | 8/1985 |
| DE | 42 40 313 A1 | 6/1994 |
| DE | 19 943 642 A1 | 3/2001 |
| DE | 10311063 A1 | 9/2004 |
| DE | 102007011069 A1 | 9/2008 |
| DE | 102011103132 A1 | 11/2012 |
| EP | 0 110 238 A2 | 6/1984 |
| EP | 0110221 A2 | 6/1984 |
| EP | 0 500 496 A1 | 8/1992 |
| EP | 0517044 A2 | 12/1992 |
| EP | 0 570 165 A2 | 11/1993 |
| EP | 0 716 919 A2 | 6/1996 |
| EP | 0839623 A1 | 5/1998 |
| EP | 1308084 A1 | 5/2003 |
| EP | 1319335 A1 | 6/2003 |
| EP | 1506249 A1 | 2/2005 |
| EP | 1 582 549 A1 | 10/2005 |
| EP | 2179857 A1 | 4/2010 |
| JP | 2011-016304 * | 1/2011 |
| WO | WO-96/15102 A2 | 5/1996 |
| WO | WO-0226862 A1 | 4/2002 |
| WO | WO-2005113639 A1 | 12/2005 |
| WO | WO-2006/108520 A1 | 10/2006 |
| WO | WO-2008037364 A1 | 4/2008 |
| WO | WO-2008/071363 A2 | 6/2008 |
| WO | WO-2008/109072 A1 | 9/2008 |

* cited by examiner

Figure 1: Results from experimental series 1
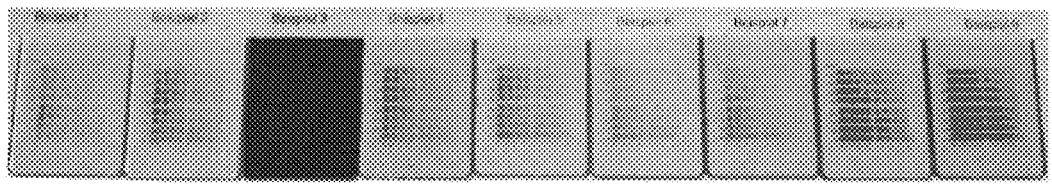
Figure 2: Results from experimental series 2
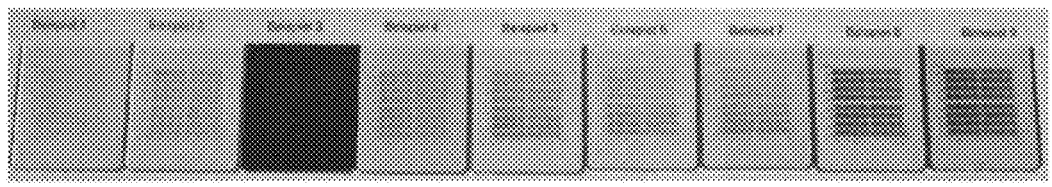
Figure 3: Results from experimental series 3
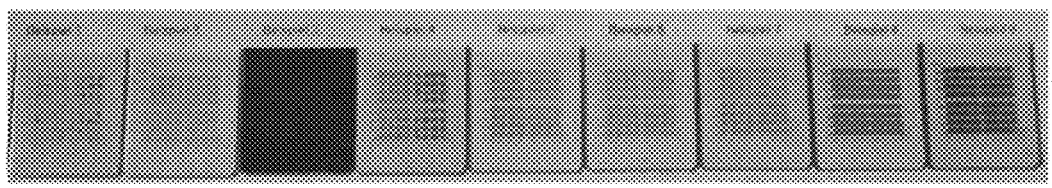
Figure 4: Results from experimental series 4
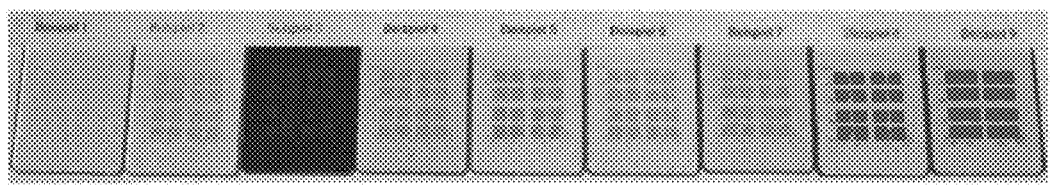
Figure 5.1: Color sample plaques composed of pellets made of mixtures 1 to 9;
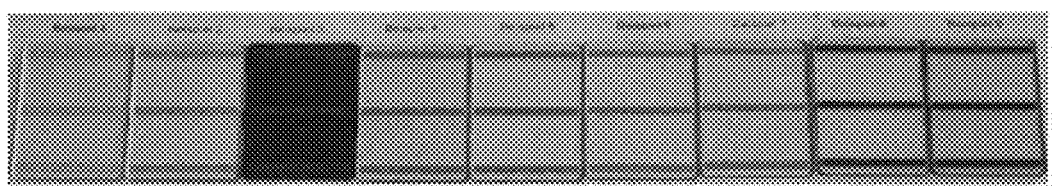

Figure 5.2: Composites 3A to 9A composed of foils and color sample plaques comprising pellets from mixture 1:
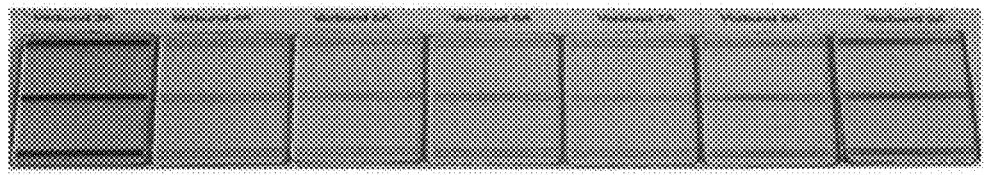
Figure 6.1:   Sheet from 8.1 with UV-laser markings
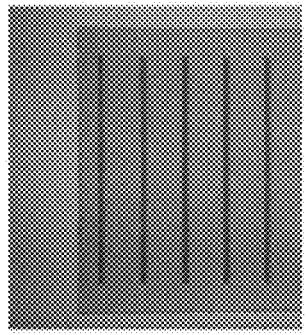
Figure 6.2:   Sheet from 8.2 with UV-laser markings
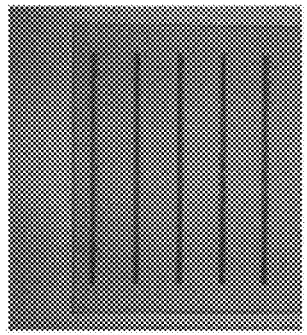

Figure 7.1: Sheet from 8.1 with IR-laser markings
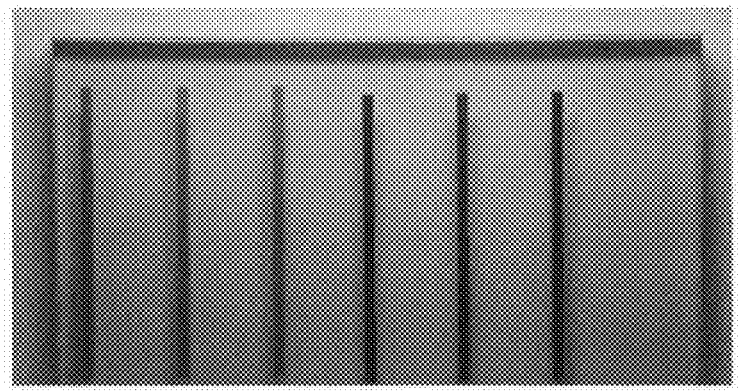
Figure 7.2: Sheet from 8.2 with IR-laser markings
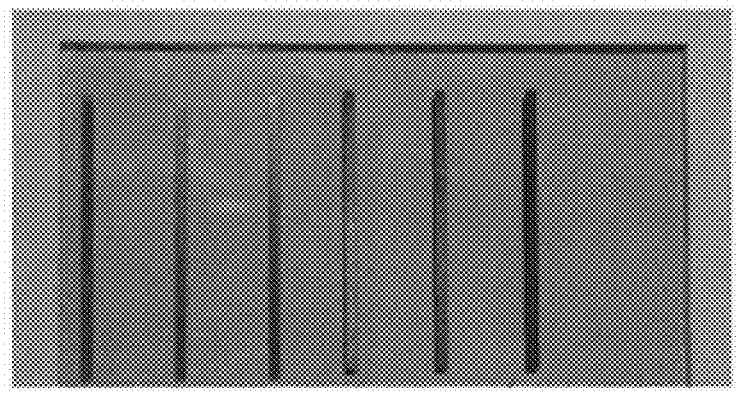

BIRD PROTECTION GLAZING

CROSS-REFERENCE TO RELATED APPLICATIONS

This application is a national stage application (under 35 U.S.C. §371) of PCT/EP2014/050810, filed Jan. 16, 2014, which claims benefit of European Application No. 13151893.8, filed Jan. 18, 2013, both of which are incorporated herein by reference in their entirety.

The invention relates to at least to some extent transparent or translucent plastics moldings for the production of noise barriers, façade components, and paneling, providing effective bird protection.

BACKGROUND OF THE INVENTION

In the field of noise barriers, façade components, and paneling with transparent or translucent segments, a topic that continues to increase in importance is bird impact. A wide variety of structures and markings have been proposed in the past for preventing birds from flying into transparent areas.

The use of markings featuring UV absorption is known from a variety of sectors, e.g. that of ID cards, described by way of example in EP 2 179 857 A1.

EP 1 319 335 A1 by way of example describes the marking of transparent materials via mechanical, physical, and/or chemical treatment. It is proposed that the better capability of birds to perceive UV light is utilized to provide bird-protection devices.

DE 10 2011 103 132 A1 describes a glazing unit with a structure for protection from bird impact, where the arrangement has said structure on at least one side of the glazing unit, and said structure is perceived by the eye of a bird to be an obstruction through which it is not possible to fly, where luminescent pigments which absorb in the UV region and, by means of Stokes shift, emit in the longer- or shorter-wavelength region have been admixed with the graphic coating elements.

On the other hand, H. Haupt, Berichte zum Vogelschutz [Bird protection reports], volume 47/48, 2011, 143-160 indicates that it would be premature to describe UV markings as sufficiently effective for the prevention of bird impact.

More recent studies also confirm that the conventional application of traditional raptor silhouettes is not adequately effective.

It has been found that markings in the form of stripes or spots on a transparent element are more effective than the known raptor silhouettes in preventing bird impact, where these markings are applied in the form of adhesive strips after manufacture of the transparent segment. An alternative to this is the possibility of using screen printing or other layer-forming application processes to place markings on the surface of the transparent segments.

The disadvantage of both processes for the application of markings is that they involve a great deal of work and therefore incur considerable additional costs. Modifications of this type applied to the surface moreover exhibit weathering phenomena and peeling after a number of years in outdoor use, and thus become ineffective.

Processes for using lasers for the marking of transparent construction elements are in principle known, being described by way of example in DE 34 02 871 A1 and also in J. Bosman, Processes and strategies for solid state Q-switch laser marking of polymers, doctoral thesis, Enschede, 2007, ISBN 978-9-03-652346-2.

BRIEF SUMMARY OF THE INVENTION

It is therefore an object of the present invention to provide plastics moldings that are to some extent transparent or translucent for the production of noise barriers/wall units, façade components, and paneling with improved protection from bird impact, where these have a durably resistant marking, where the markings have high precision of detail, and have no adverse effect on the impact resistance of the molding. The plastics moldings have high light transmittance and color neutrality, with preferably little surface reflection, and feature excellent impact resistance.

Another object of the present invention is to provide the polymer compositions mentioned for the production of the marked plastics moldings.

DETAILED DESCRIPTION OF THE INVENTION

The object is achieved via
plastics moldings comprising
  a) at least one substrate layer comprising at least one thermoplastic polymer, where the substrate layer comprises a base layer and, adjacent thereto, a coextruded layer, and where the coextruded layer comprises at least one IR absorber,
  b) optionally at least one outer layer on at least one side of the substrate layer,
  c) optionally a primer or intermediate layer between the layers a) and b),
characterized in that the plastics molding has, in the substrate layer, markings which reduce the transparency of the molding in the wavelength range from 380 to 780 nm in the marked regions,
and use of these for the production of bird-protected glazing.

For the purposes of the present invention, durably means than 10 years, preferably more than 20 years, and particularly preferably more than 30 years.

For the purposes of the present invention, "visible light" means the region of light from 380 nm to 780 nm, and the "IR radiation" region means the region of the near infrared (NIR) from 780 nm to 2500 nm, and the "UV radiation" region means the region from 100 nm to 380 nm.

For the purposes of the present invention, transparency means that when the background is viewed through the transparent material, e.g. in the form of an appropriate molding, it can be clearly discerned. Mere translucency, for example in the case of milk glass, through which the background appears blurred, is not sufficient for the appropriate material to be described as transparent. For the purposes of the present invention the initial haze of transparent thermoplastic polymers and, respectively, the thermoplastic polymer compositions is moreover less than 5.0%, preferably 4.0%, more preferably less than 3.0%, with particular preference less than 2.0%. For the purposes of the present invention haze is, unless otherwise stated, determined in accordance with ASTM D 1003 by a BYK Gardner Haze Gard.

Preferred embodiments mentioned in the present invention can exist either individually or else in combination with one another.

The plastics moldings of the invention have markings which, in the marked regions, reduce the transparency of the molding.

In the unmarked regions, a molding is transparent, with initial haze as described above.

The light transmittance (Ty) of the unmarked regions is moreover preferably in the range from 15% to 95%, preferably in the range from 20% to 90%, particularly preferably in the range of 30% to 90%. Unless otherwise stated in the present invention, the transmittance measurements and reflectance measurements are made in a Lambda 900 spectrophotometer from Perkin Elmer with photometer sphere in accordance with ISO 13468-2 (i.e. determination of total transmittance via measurement of diffuse transmittance and direct transmittance). The values are measured over the wavelength range from 380 nm to 780 nm.

In one particular embodiment compliance is required with the following preconditions relating to the color of a transparent molding preferably made of polycarbonate, PMMA, or PS, preferably PC:
$a^*=0\pm5$ and $b^*=0\pm5$, preferably $a^*=0\pm4$ and $b^*=0\pm4$ and with particular preference $a^*=0\pm2$ and $b^*=2$.

The color is determined in transmission by a Lambda 900 spectrophotometer from Perkin Elmer with photometer sphere by a method based on ASTM E1348, using the weighting factors and formulae described in ASTM E308.

The CIELAB color coordinates $L^*$, $a^*$, $b^*$ are calculated for illuminant D 65 with 10° standard observer.

The extent of coverage by the markings, i.e. the portion of the surface of the plastics molding that is no longer transparent in the sense of the above definition, is usually in the range from 3% to 85%. An extent of coverage of from 2 to 40% is generally preferred, from 3 to 30% being more preferred, and from 4 to 25% being still more preferred.

It is preferable that the arrangement of the markings is uniform/homogeneous on the area of the plastics molding. Homogeneous distribution of the markings in the present invention means that there is no accumulation of the markings in a certain region of the transparent segment, but instead the markings have uniform distribution on the segment. Another possibility in an alternative embodiment is an erratic arrangement of the markings.

With regard to the arrangement and shape of the markings, it is preferable to comply with the condition that the markings do not leave any uncovered transparent areas of average diameter greater than 250 nm, with preference greater than 200 mm, and with greater preference greater than 150 mm.

In an embodiment to which further preference is given, the markings are simple geometric shapes, e.g. circles, ovals, triangles, quadrilaterals, pentagons, hexagons, and octagons.

In an embodiment that is an alternative to this, the markings are complex figures, e.g. birds, flowers, and irregular multipointed stars, preferably having from 4 to 8 points, silhouettes of buildings or of towns, or writings.

It is preferable that the average diameter of the markings, irrespective of the shape thereof, is at least 5 mm, with more preference at least 10 mm, and with particular preference at least 20 mm. The maximal average diameter of the markings is preferably smaller than 300 mm, with more preference smaller than 250 mm, and with particular preference smaller than 200 mm.

The average diameter of any desired geometric shape is the average value calculated from the distance between the two most distant points on the periphery and the distance between the two least distant points on the periphery of said geometric shape, where both distances are measured through the center of gravity of the geometric shape.

The markings can be arranged to form lines or pairs of lines which in turn can have homogeneous distribution over the transparent segment; a horizontal orientation is more preferred than a vertical or diagonal orientation here.

In the case of horizontal orientation of the linear markings, the line width of these is preferably from 1.5 mm to 15 mm, with more preference from 2 mm to 7 mm, and with particular preference 3 mm; with further preference these are in turn arranged at a regular distance from one another of from 1.5 cm to 10 cm, with further preference from 2 cm to 8 cm, and with particular preference from 3 cm to 5 cm. The width of the markings and separations are preferably determined with reference to one another in such a way as generally to give an extent of coverage of the surface of the molding that is preferably from 4% to 25%, with more preference from 5% to 15%, and with particular preference from 5% to 10%.

In the case of vertical orientation of the linear markings, the line width of these is preferably from 3 mm to 20 mm, with more preference from 4 mm to 8 mm, and with particular preference 5 mm; with further preference these are in turn arranged at a regular distance from one another of from 4 cm to 20 cm, with further preference from 6 cm to 15 cm, and with particular preference from 8 cm to 12 cm. The width of the markings and separations are preferably determined with reference to one another in such a way as to give an extent of coverage of the surface of the molding that is preferably from 2% to 25%, with more preference from 3% to 15%, and with particular preference from 4% to 10%.

In the case of non-linear markings the extent of coverage of the surface of the molding is preferably from 5% to 40%, with more preference from 10% to 30%, and with particular preference from 15% to 25%; it is further preferable here that for an average diameter of the markings of up to 30 mm the extent of coverage is at least 25%, and that for an average diameter of the markings of >=30 mm the extent of coverage is at least 15%.

The transparency (light transmittance) of the markings is less than 5.0%, preferably less than 3.0%, and with particular preference less than 1.0%.

The contrast, between a marked and an unmarked location defined as quotient calculated from the difference between the light transmittance of an unmarked and a marked location as dividend and from the sum of light transmittance of the marked and unmarked location as divisor, is preferably at least 90%, with particular preference 95%, and with very particular preference 98%.

The surface reflectance of the plastics molding (measured from 380 nm to 780 nm) is preferably smaller than 20%, with more preference smaller than 15%, and with still more preference smaller than 10%, and with particular preference smaller than 8%.

The low reflectance avoids reflection, in the surface, of a park landscape or else of a sky with clouds, giving birds the false impression of an attractive space to be occupied and, respectively, an open space into which they can fly, so that they fly directly toward this without knowing that this is merely a reflected image.

The markings are introduced by way of a laser into the substrate layer or the outer layer of the plastics molding.

It is preferable that the laser is an Nd:YAG laser or fiber laser with 1064 nm wavelength, or else a UV (ultraviolet) laser (Nd:YVO$_4$ laser) with 355 nm wavelength.

The laser marking of the thermoplastic can preferably be achieved in-line during the extrusion process, or else as an alternative to this in a downstream step.

The plastics molding of the invention comprises:
a) at least one substrate layer (matrix/base layer) comprising at least one thermoplastic polymer,
b) optionally at least one outer layer on at least one side of the substrate layer, e.g. scratch-resistant layer, e.g. a layer applied via CVD (chemical vapor deposition) or PVD (physical vapor deposition) made of $SiO_2$, of silicates, or of carbides, or else of diamond, and/or an antireflective layer,
c) optionally a primer or intermediate layer between the layers a) and b).

a1) Examples of thermoplastics that are suitable in the invention, being transparent in the visible region, are polycarbonate, copolycarbonate, polyester carbonate, polystyrene, styrene copolymers, aromatic polyesters such as polyethylene terephthalate (PET), PET-cyclohexanedimethanol copolymer (PETG), polyethylene naphthalate (PEN), polybutylene terephthalate (PBT), cyclic polyolefin, poly- or copolyacrylates and poly- or copolymethacrylate, e.g. poly- or copolymethyl methacrylates (such as PMMA), and also copolymers with styrene, e.g. transparent polystyrene-acrylonitrile (PSAN), thermoplastic polyurethanes, polymers based on cyclic olefins (e.g. TOPAS®, a product available commercially from Ticona), with more preference polycarbonate, copolycarbonate, polyester carbonate, aromatic polyesters or polymethyl methacrylate, or a mixture of the components mentioned, and with particular preference polycarbonate and copolycarbonate.

Mixtures of a plurality of transparent thermoplastic polymers are also possible, insofar as they can be mixed with one another to give a transparent mixture, and preference is given here to a mixture of polycarbonate with PMMA (with more preference using <2% by weight of PMMA) or polyester.

Among the transparent thermoplastics, polymers based on polymethyl methacrylate (PMMA) and polycarbonate have particularly good suitability for the use as glazing material. In particular, the high toughness of polycarbonate gives it a particularly good property profile for applications of this type.

The thermoplastic polymer of the substrate layer a) is preferably a polycarbonate or PETG, with particular preference polycarbonate.

Particular preference is given to a polycarbonate with a melt volume rate of from 3 $cm^3$/(10 min) to 25 $cm^3$/(10 min), with preference from 4 to 18 $cm^3$/(10 min), with particular preference from 5 to 10 $cm^3$/(10 min), in accordance with ISO 1133 (at 300° C. with 1.2 kg load).

Suitable polycarbonates for the production of the plastics composition of the invention are any of the known polycarbonates. These are homopolycarbonates, copolycarbonates, and thermoplastic polyester carbonates.

With preference the molar masses $\overline{M}_w$ of the suitable polycarbonates are from 10 000 to 50 000 g/mol, preferably from 14 000 to 40 000 g/mol, and in particular from 16 000 to 32 000 g/mol, and with very particular preference from 24 000 to 31 000 g/mol, determined via gel permeation chromatography with polycarbonate calibration.

The polycarbonates are preferably produced by the interfacial process or by the melt transesterification process, these being widely described in the literature.

In relation to the interfacial process reference may be made by way of example to H. Schnell, "Chemistry and Physics of Polycarbonates", Polymer Reviews, vol. 9, Interscience Publishers, New York 1964, pp. 33 ff., to Polymer Reviews, vol. 10, "Condensation Polymers by Interfacial and Solution Methods", Paul W. Morgan, Interscience Publishers, New York 1965, chapter VIII, p. 325, to Dres. U. Grigo, K. Kircher and P. R. Müller "Polycarbonate" in Becker/Braun, Kunststoff-Handbuch [Plastics handbook], volume 3/1, Polycarbonate, Polyacetale, Polyester, Celluloseester [Polycarbonates, polyacetals, polyesters, cellulose esters], Carl Hanser Verlag Munich, Vienna, 1992, pp. 118-145, and also to EP 0 517 044 A1.

The melt transesterification process is described by way of example in Encyclopedia of Polymer Science, vol. 10 (1969), Chemistry and Physics of Polycarbonates, Polymer Reviews, H. Schnell, vol. 9, John Wiley and Sons, Inc. (1964), and also in the patents DE-B 10 31 512 and U.S. Pat. No. 6,228,973.

The polycarbonates are preferably produced via reactions of bisphenol compounds with carbonic acid compounds, in particular phosgene, or in the case of the melt transesterification process diphenyl carbonate or dimethyl carbonate.

Particular preference is given here to homopolycarbonates based on bisphenol A and copolycarbonates based on the monomers bisphenol A and 1,1-bis(4-hydroxyphenyl)-3,3,5-trimethylcyclohexane.

These and other bisphenol compounds or diol compounds that can be used for the polycarbonate synthesis are disclosed inter alia in WO 2008037364 A1 (p. 7, line 21 to p. 10, line 5), EP 1 582 549 A1 ([0018] to [0034]), WO 2002026862 A1 (p. 2, line 20 to p. 5, line 14), WO 2005113639 A1 (p. 2, line 1 to p. 7, line 20).

The polycarbonates can be linear or branched. It is also possible to use mixtures of branched and unbranched polycarbonates.

Suitable branching agents for polycarbonates are known from the literature and described by way of example in the patents U.S. Pat. No. 4,185,009 and DE 25 00 092 A1 (3,3-bis(4-hydroxyaryloxindoles) of the invention, see entire document in each case), DE 42 40 313 A1 (see p. 3, lines 33 to 55), DE 19 943 642 A1 (see p. 5, lines 25 to 34) and U.S. Pat. No. 5,367,044, and also literature cited therein.

It is moreover also possible that the polycarbonates used have intrinsic branching, and in this case no branching agent is added during the course of production of the polycarbonate. The structures known as Fries structures disclosed in EP 1 506 249 A1 for melt polycarbonates are an example of intrinsic branching.

It is moreover possible to use chain terminators during the production of the polycarbonate. Chain terminators used are preferably phenols such as phenol, alkylphenols such as cresol and 4-tert-butylphenol, chlorophenol, bromophenol, cumylphenol, or a mixture of these.

The polymer composition for the substrate layer (base layer) of the invention comprising the abovementioned components and other optional components is produced by familiar incorporation processes via combination, mixing, and homogenization, where in particular the homogenization preferably takes place in the melt with exposure to shear forces. The combination and mixing optionally take place before homogenization in the melt, with use of powder premixes.

It is also possible to use premixes produced from solutions of the mixture components in suitable solvents, with the option of homogenization in solution, and subsequent removal of the solvent.

In particular here, the components of the composition of the invention can be introduced via known processes, inter alia in the form of masterbatch.

The use of masterbatches, and also of powder mixtures or compacted premixes, is particularly suitable for the introduction of the components mentioned in the present invention. It is possible here, if desired, to premix all of the abovementioned components. A possible alternative, however, is use of premixes of the components. In order to improve metering capability during the production of the thermoplastic polymer compositions, it is preferable in all cases that sufficient pulverulent polymer component is added to the abovementioned component premixes to produce total volumes that are easy to handle.

In one particular embodiment the abovementioned components can be mixed to give a masterbatch, and this mixing preferably takes place in the melt with exposure to shear forces (for example in a kneader or twin-screw extruder). This process has the advantage of better distribution of the components in the polymer matrix. When producing the masterbatch it is preferable to select, as polymer matrix, the thermoplastic that is also the main component of the final overall polymer composition.

This composition can be combined in conventional devices such as screw-based extruders (e.g. twin-screw extruders, TSE), kneaders, Brabender mixers, or Banbury mixers, mixed, homogenized, and then extruded. The extrudate can be cooled and comminuted. It is also possible to premix individual components and then to add the remaining starting materials individually and/or likewise in a mixture. The substrate layer a) comprises, alongside the thermoplastic polymer, which together with other components gives 100% by weight, at least one IR absorber in the coextruded layer, where said IR absorber can also be selected from the compounds mentioned below, and optionally the following components, and if appropriate also other IR absorbers; the components here can be combined independently of one another:

a2) one or more inorganic IR absorbers from the group of the boride compounds of the $M_xB_y$ type (M=La, Ce, Pr, Nd, Tb, Dy, Ho, Y, Sm, Eu, Er, Tm, Yb, Lu, Sr, Ti, Zr, Hf, V, Ta, Cr, Mo, W, and Ca); preference being given here to lanthanum hexaboride ($LaB_6$), praseodymium boride ($PrB_6$), neodymium boride ($NdB_6$), cerium boride ($CeB_6$), terbium boride ($TbB_6$), dysprosium boride ($DyB_6$), holmium boride ($HoB_6$), yttrium boride ($YB_6$), samarium boride ($SmB_6$), europium boride ($EuB_6$), erbium boride ($ErB_6$), thulium boride ($TmB_6$), ytterbium boride ($YbB_6$), lutetium boride ($LuB_6$), strontium boride ($SrB_6$), calcium boride ($CaB_6$), titanium boride ($TiB_2$), zirconium boride ($ZrB_2$), hafnium boride ($HfB_2$), vanadium boride ($VB_2$), tantalum boride ($TaB_2$), chromium boride ($CrB$ and $CrB_2$), molybdenum boride ($MoB_2$, $Mo_2B_5$, and $MoB$), tungsten boride ($W_2B_5$), and combinations of these borides. Very particular preference is given to borides based on lanthanum hexaboride ($LaB_6$) and mixtures comprising lanthanum hexaboride.

The quantity used of the borides is preferably from 0.00150% by weight to 1.0000% by weight, with more preference from 0.00200% by weight to 0.80000% by weight, and with particular preference from 0.003% by weight to 0.600% by weight, calculated as solids content of boride in the entire polymer composition. Solids content of boride means in this context that boride is used as pure substance rather than as a suspension or other preparation comprising the pure substance.

a3) One or more inorganic IR absorbers from the group of the tungsten compounds of the following type:
b1) $W_yO_z$ (W=tungsten, O=oxygen; z/y=2.20-2.99), and/or
b2) $M_xW_yO_z$ (M=H, He, alkali metal, alkaline earth metal, metal from the group of the rare earths, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, Se, Br, Te, Ti, Nb, V, Mo, Ta, Re, Be, Hf, Os, Bi; x/y=from 0.001 to 1.000; z/y=from 2.2 to 3.0), where preference is given to the elements H, Cs, Rb, K, Tl, In, Ba, Li, Ca, Sr, Fe, and Sn as M, and among these very particular preference is given to Cs. Preference is particularly given to $Ba_{0.33}WO_3$, $Tl_{0.33}WO_3$, $K_{0.33}WO_3$, $Rb_{0.33}WO_3$, $Cs_{0.33}WO_3$, $Na_{0.33}WO_3$, $Na_{0.75}WO_3$, and also mixtures of these. In one particular embodiment of the present invention, very particular preference is given to the sole use of $Cs_{0.33}WO_3$ as inorganic IR absorber. Preference is likewise given to Cs/W ratios of 0.20 and 0.25; the abovementioned tungsten compounds of the type b1) and b2) are hereinafter termed tungstates.

The IR-absorbing inorganic tungstate is preferably dispersed in an organic matrix. The quantity preferably used of the tungstates, calculated as solids content of tungstate in the entire polymer composition, is preferably from 0.0075% by weight to 0.0750% by weight, preferably from 0.0100% by weight to 0.0500% by weight, and with particular preference from 0.0125% by weight to 0.0375% by weight. Solids content of tungstate means in this context the tungstate as pure substance rather than a suspension or other preparation comprising the pure substance.

If tungstates are used alone as IR absorbers, it is preferable to use zinc-doped cesium tungstates.
a4) One or more inorganic, nanoscale pigments, preferably carbon black, in particular nanoscale carbon black.

It is preferable that the carbon black is in finely dispersed form in the organic polymer matrix, preferably being nanoscale carbon black. The average particle size of suitable carbon blacks (determined via TEM) is preferably less than 100 nanometers (nm), with more preference less than 75 nm, with still more preference less than 50 nm, and with particular preference less than 40 nm; the average particle size here is preferably greater than 0.5 nm, with more preference greater than 1 nm, and with particular preference greater than 5 nm.

Carbon blacks suitable for the purposes of the invention differ from what are known as conductive carbon blacks in that they have low, or no, electrical conductivity. Conductive carbon blacks are unlike the carbon blacks used here in having particular morphologies and superstructures for achieving high conductivity. In contrast to this, the nanoscale carbon blacks used here give very good dispersion in thermoplastics, thus producing hardly any coherent domains of carbon black which could provide corresponding conductivity. Carbon blacks that are commercially available and are suitable for the purposes of the invention are obtainable with a wide variety of trademarks and in a wide variety of forms, for example pellets or powders: suitable carbon blacks—all obtainable from Cabot Corporation— have the trademark BLACK PEARLS®, or take the form of wet-processed pellets known as ELFTEX®, REGAL®, and the CSX®, and in a floccular form known as MONARCH®, ELFTEX@, REGAL®, and MOGUL®.

In one particularly preferred embodiment the particle sizes of the carbon blacks are from 10 nm to 30 nm, and the surface area thereof is preferably from 35 $m^2$ to 138 $m^2$ per g ($m^2$/g). The carbon black can be a treated or untreated carbon black: the carbon black can have been treated with particular gases, with silica, or with organic substances, e.g. butyllithium. This type of treatment can achieve modification or functionalization of the surface. This can promote compatibility with the matrix used. Preference is in particular given to carbon blacks treated with the trademark BLACK PEARLS® (CAS No. 1333-86-4).

The concentrations of the nanoscale carbon black used in the composition of the invention are preferably from 0.00080% by weight to 0.03500% by weight, with particular preference from 0.00090% by weight to 0.03000% by weight, and with very particular preference from 0.00100% by weight to 0.02000% by weight (based on the entire composition).

a5) One or more organic infrared (IR) absorbers, as described for example in M. Matsuoka, Infrared Absorbing Dyes, Plenum Press, New York, 1990. Particularly suitable infrared absorbers are those from the classes of the phthalocyanines, naphthalocyanines, metal complexes, azo dyes, anthraquinones, quadratic acid derivatives, immonium dyes, perylenes, quaterrylenes, and polymethines. Among these, phthalocyanines and naphthalocyanines are very particularly suitable.

Phthalocyanines and naphthalocyanines having bulky pendant groups, for example phenyl, phenoxy, alkylphenyl, alkylphenoxy, tert-butyl, (—S-phenyl), —NH-aryl, —NH-alkyl, and similar groups are preferable because they have better solubility in thermoplastics.

a6) One or more mold-release agents based on a fatty acid ester, preferably on a stearic ester, with particular preference based on pentaerythritol.

In one particular embodiment, pentaerythritol tetrastearate (PETS) and/or glycerol monostearate (GMS) are used.

The quantity used of one or more mold-release agents is from 0.01% by weight to 1.0% by weight, preferably from 0.01% by weight to 0.50% by weight, particularly preferably from 0.05% by weight to 0.40% by weight.

a7) One or more heat stabilizers. Phosphites and phosphonites, and also phosphines, are preferably suitable. Examples are triphenyl phosphite, diphenyl alkyl phosphite, phenyl dialkyl phosphite, tris(nonylphenyl)phosphite, trilauryl phosphite, trioctadecyl phosphite, distearyl pentaerythritol diphosphite, tris(2,4-di-tert-butylphenyl)phosphite, diisodecyl pentaerythritol diphosphite, bis(2,4-di-tert-butylphenyl) pentaerythritol diphosphite, bis(2,4-dicumylphenyl)pentaerythritol diphosphite, bis(2,6-di-tert-butyl-4-methylphenyl)pentaerythritol diphosphite, diisodecyloxy pentaerythritol diphosphite, bis(2,4-di-tert-butyl-6-methylphenyl)pentaerythritol diphosphite, bis(2,4,6-tris(tert-butyl) phenyl)pentaerythritol diphosphite, tristearyl sorbitol triphosphite, tetrakis(2,4-di-tert-butylphenyl) 4,4'-biphenylenediphosphonite, 6-isooctyloxy-2,4,8,10-tetra-tert-butyl-12H-dibenzo[d,g]-1,3,2-dioxaphosphocine, bis(2,4-di-tert-butyl-6-methylphenyl)methyl phosphite, bis(2,4-di-tert-butyl-6-methylphenyl)ethyl phosphite, 6-fluoro-2,4,8,10-tetra-tert-butyl-12-methyldibenzo[d,g]-1,3,2-dioxaphosphocine, 2,2',2"-nitrilo[triethyltris(3,3',5,5'-tetra-tert-butyl-1,1'-biphenyl-2,2'-diyl)phosphite], 2-ethylhexyl (3,3',5,5'-tetra-tert-butyl-1,1'-biphenyl-2,2'-diyl)phosphite, 5-butyl-5-ethyl-2-(2,4,6-tri-tert-butylphenoxy)-1,3,2-dioxaphosphirane, bis(2,6-di-tert-butyl-4-methylphenyl)pentaerythritol diphosphite, triphenylphosphine (TPP), trialkylphenylphosphine, bisdiphenylphosphinoethane, or a trinaphthylphosphine. It is particularly preferable to use triphenylphosphine (TPP), Irgafos® 168 (tris(2,4-di-tert-butylphenyl)phosphite), and tris(nonylphenyl)phosphite, or a mixture of these.

It is moreover possible to use phenolic antioxidants such as alkylated monophenols, alkylated thioalkylphenols, hydroquinones, and alkylated hydroquinones. It is particularly preferable to use Irganox® 1010 (pentaerythritol 3-(4-hydroxy-3,5-di-tert-butylphenyl)propionate; CAS: 6683-19-8) and Irganox 1076® (2,6-di-tert-butyl-4-(octadecanoxycarbonylethyl)phenol).

In one specific embodiment of the present invention the phosphine compounds of the invention are used together with a phosphite or with a phenolic antioxidant or with a mixture of the two latter compounds.

Quantities used of the heat stabilizers are from 0.00% by weight to 0.20% by weight, preferably from 0.01% by weight to 0.10% by weight, with more preference from 0.01% by weight to 0.05% by weight, and with particular preference from 0.015% by weight to 0.040% by weight.

a8) One or more processing stabilizers based on phosphate. The phosphate here preferably has the following structure (8)

where R1 to R3 can be H or identical or different linear, branched, or cyclic alkyl moieties. Preference is in particular given to $C_1$-$C_{13}$ alkyl moieties. $C_1$-$C_{18}$-alkyl is by way of example methyl, ethyl, n-propyl, isopropyl, n-butyl, sec-butyl, tert-butyl, n-pentyl, 1-methylbutyl, 2-methylbutyl, 3-methylbutyl, neopentyl, 1-ethylpropyl, cyclohexyl, cyclopentyl, n-hexyl, 1,1-dimethylpropyl, 1,2-dimethylpropyl, 1,2-dimethylpropyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl, 1-ethyl-2-methylpropyl, or 1-ethyl-2-methylpropyl, n-heptyl, or n-octyl, pinakyl, adamantyl, the isomeric menthyls, n-nonyl, n-decyl, n-dodecyl, n-tridecyl, n-tetradecyl, n-hexadecyl or n-octadecyl.

Examples of alkyl phosphates suitable in the invention are mono-, di-, and trihexyl phosphate, triisoctyl phosphate, trinonyl phosphate. It is preferable to use triisooctyl phosphate (tris-2-ethyl-hexyl phosphate) as alkyl phosphate. It is also possible to use mixtures of various mono-, di-, and trialkyl phosphates.

Quantities used of the processing stabilizers used are less than 0.0500% by weight, preferably from 0.00005% by weight to 0.05000% by weight, with particular preference from 0.0002 to 0.0500% by weight, with very particular preference from 0.0005% by weight to 0.0300% by weight, and in one very preferred case from 0.001% by weight to 0.0120% by weight, based on the total weight of the composition.

a9) A proportion of from 0.0% by weight to 20.00% by weight, preferably from 0.05% by weight to 10.00% by weight, with more preference from 0.10% by weight to 7.00% by weight, with still more preference from 0.10% by weight to 0.50% by weight, and with very particular preference from 0.10% by weight to 0.30% by weight, of at least one or more UV (ultraviolet) absorbers, based on the total weight of the composition.

Suitable UV absorbers are described by way of example in EP 1 308 084 A1, in DE 102007011069 A1, and also in DE 10311063 A1. Particularly suitable ultraviolet absorbers are hydroxybenzotriazoles, such as 2-(3',5'-bis(1,1-dimethylbenzyl)-2'-hydroxyphenyl)-benzotriazole (Tinuvin® 234, BASF AG Ludwigshafen), 2-(2'-hydroxy-5'-(tert-octyl)phenyl)benzotriazole (Tinuvin® 329, BASF AG Ludwigshafen), 2-(2'-hydroxy-3'-(2-butyl)-5'-(tert-butyl)-phenyl) benzotriazole (Tinuvin® 350, BASF AG Ludwigshafen), bis(3-(2H-benzotriazolyl)-2-hydroxy-5-tert-octyl)methane (Tinuvin® 360, BASF AG Ludwigshafen), (2-(4,6-diphenyl-1,3,5-triazin-2-yl)-5-(hexyloxy)phenol (Tinuvin® 1577, BASF AG Ludwigshafen), and also the benzophenones 2,4-dihydroxybenzophenone (Chimassorb® 22, BASF AG Ludwigshafen) and 2-hydroxy-4-(octyloxy)benzophenone (Chimassorb® 81, BASF AG Ludwigshafen), 2-propenoic acid, 2-cyano-3,3-diphenyl-, 2,2-bis[[(2-cyano-1-oxo-3,3-diphenyl-2-propenyl)oxy]methyl]-1,3-propanediyl ester (9CI) (Uvinul® 3030, BASF AG Ludwigshafen), 2-[2-hydroxy-4-(2-ethylhexyl)oxy]phenyl-4,6-di(4-phenyl)phenyl-1,3,5-triazines (CGX UVA 006 (Tinuvin® 1600), BASF AG Ludwigshafen), and tetraethyl 2,2'-(1,4-phenylenedimethylidene)bismalonate (Hostavin® B-Cap, Clariant AG). It is also possible to use mixtures of these ultraviolet absorbers.

a10) One or more colorants or pigments, e.g. sulfur-containing pigments such as cadmium red and cadmium yellow, iron-cyanide-based pigments such as Berlin blue, oxide pigments such as titanium dioxide, zinc oxide, red iron oxide, black iron oxide, chromium oxide, titanium yellow, zinc-iron-based brown, titanium-cobalt-based green, cobalt blue, copper-chromium-based black and copper-iron-based black, or chromium-based pigments such as chromium yellow, phthalocyanine-derived dyes such as copper-phthalocyanine blue and copper phthalocyanine green, condensed polycyclic dyes and pigments such as azo-based systems (e.g. nickel azo yellow), sulfur-indigo dyes, perinone-based, perylene-based, quinacridone-derived, dioxazine-based, isoindolinone-based, and quinophthalone-derived derivatives, anthraquinone-based, heterocyclic systems.

Specific examples of commercially available products are MACROLEX® Blue RR, MACROLEX® Violet 3R, MACROLEX® Violet B (Lanxess AG, Germany), Sumiplast® Violet RR, Sumiplast® Violet B, Sumiplast® Blue OR, (Sumitomo Chemical Co., Ltd.), Diaresin® Violet D, Diaresin® Blue G, Diaresin® Blue N (Mitsubishi Chemical Corporation), Heliogen® Blue, or Heliogen® Green (BASF AG, Germany).

Among these, preference is given to cyanine derivatives, quinoline derivatives, anthraquinone derivatives, phthalocyanine derivatives.

a11) The base layer optionally comprises from 0.0% by weight to 5.0% by weight, preferably from 0.01% by weight to 1.00% by weight of at least one other additive different from a2)-a10). The other additives are conventional polymer additives, for example those described in EP-A 0 839 623, WO-A 96/15102, EP-A 0 500 496 or "Plastics Additives Handbook", Hans Zweifel, 5th edition 2000, Hanser Verlag, Munich, e.g. flame retardants, antistatic agents, or flow improvers. The base-layer components already mentioned are expressly excluded here.

In one preferred embodiment, the base layer comprises at least one IR-radiation-absorbing additive, preferably selected from the group comprising components a2, a3, a4, a5, and with more preference a UV absorber, preferably selected from the UV absorbers of the group a9. These additives can also be termed "laser absorbers" below; IR absorbers used here are preferably the additives a2 to a5, with particular preference a2 to a4, with very particular preference a2 and a3.

In a more preferred embodiment the base layer comprises at least one laser absorber and at least one other component selected from the group comprising mold-release agents, UV absorbers, processing stabilizers, and heat stabilizers, more preferably at least one UV absorber and one heat stabilizer, and/or processing stabilizer.

In an embodiment to which still more preference is given, the base layer comprises a laser absorber of components a2 to a5, a UV absorber, and a mold-release agent.

IR absorbers/laser absorbers are preferably lanthanum borides, more preferably lanthanum hexaboride, with particular preference in concentrations of from 0.005 to 0.500% by weight (based on the total weight of the composition), and also carbon black, with particular preference in concentrations of from 10 ppm to 100 ppm.

It is possible in principle to modify the matrix of the entire transparent segment, i.e. the entire substrate layer. In the invention, the modification is achieved with an IR and UV absorber in a layer close to a surface (e.g. produced via coextrusion, lamination, or multicomponent injection molding). It is thus possible to achieve a significant increase in the replication capability of, and precision detailing of, the marking. The use of the additives in a thin layer close to a surface moreover ensures the color-neutrality of the transparent segments.

Again, in these layers close to a surface the concentration of the laser absorbers is within the abovementioned ranges.

The thicknesses of the finished parts here are preferably from 12 mm to 20 mm, with more preference from 14 to 19 mm, and with particular preference from 15 mm to 18 mm.

In one preferred embodiment the plastics molding comprises an outer layer.

The application of the outer layer can take place simultaneously or immediately after the shaping of the base (substrate layer), e.g. via coextrusion or multicomponent injection molding. However, this application process, e.g. via lamination with a film or a foil, or via coating with a solution, can also take place on the base after it has completed a molding process.

However, it is preferable that sheets made of base layer and of optional outer layer(s) are produced via (co)extrusion.

For the extrusion process, the polymer composition optionally pretreated, for example by drying, is introduced into the extruder, and is melted in the plastification system of the extruder. The plastics melt is then forced through a slot die or a double-walled die and thus shaped, converted to the desired final shape in the nip of a polishing calendar, its shape then being fixed by cooling of alternate sides on polishing rolls and ambient-air cooling. The temperatures set are those required for the extrusion of the polymer composition; it is usually possible here to follow the manufacturer's instructions. If by way of example the polymer compositions comprise polycarbonates with high melt viscosity, these are normally processed at melt temperatures of 260° C. to 350° C., and the temperatures of the plastifying barrel, and also the die temperatures, are set accordingly.

By use of one or more ancillary extruders and of a multiple-manifold die, or optionally suitable melt adapters upstream of a slot die, thermoplastic melts of different composition can be mutually superposed, and multilayer sheets or foils can thus be produced. (For the coextrusion process see by way of example EP-A 0 110 221, EP-A 0 110 238, and EP-A 0 716 919, and for details of the adapter and die process see Johannaber/Ast: "Kunststoff-Maschinenführer" [Guide to plastics machinery], Hanser Verlag, 2000, and in Gesellschaft Kunststofftechnik: "Coextrudierte Folien und Platten: Zukunftsperspektiven, Anforderungen, Anlagen und Herstellung, Qualitätssicherung" [Coextruded foils and sheets: outlook, requirements, plant and production processes, quality assurance], VDI-Verlag, 1990.)

Products or moldings preferred in the invention are sheets, foils, and glazing. Products that can be used here are not only solid sheets but also double-wall sheets or multi-wall sheets.

The products of the invention can comprise, as other components alongside the compositions of the invention, by way of example parts made of other materials. By way of example, glazing can comprise sealing materials at the periphery of the glazing. Roof-construction systems can by way of example comprise metal components such as screws, metal pins, or the like; these can serve for the fixing or (in the case of folding or sliding roofs) guiding of the roof-construction units.

It is moreover possible to bond other materials to the compositions of the invention, for example in the two-component injection-molding process: the appropriate plastics molding with IR-absorbing properties can be provided with a periphery which by way of example serves for adhesive bonding.

In one particular embodiment, the items made of the composition of the present invention are coated. This coating serves to protect the thermoplastic material from general effects of weathering (e.g. damage due to sunlight), and also from mechanical impairment of the surface (e.g. scratching), and thus increases the robustness of the items thus treated.

It is known that various coatings can be used to protect polycarbonates from UV radiation. These coatings usually comprise UV absorbers. These layers also increase the scratch-resistance from the appropriate items. Systems used on the items derived from the present invention can have one or more layers. The items can have coatings on one or both sides. In one preferred embodiment the item comprises a scratch-resistant lacquer comprising UV absorber. In one particular embodiment the multilayer product comprises at least one layer comprising the composition of the invention, at least one UV-protection layer and optionally a scratch-resistant coating.

The UV absorber in the outer layer here can be a UV absorber selected from the group of those mentioned under a9), preferably with at least one UV absorber from the class of the benzophenones, with particular preference 4,6-dibenzoyl-2-(3-triethoxysilylpropyl)resorcinol.

It is preferable that UV absorbers are present in the outer layer and in the primer layer, in contrast, the presence of the UV absorber in the base layer is optional.

The concentration of the UV absorber, or of the UV absorber mixture, in the outer layer is from 1 to 30% by weight, preferably from 5% by weight to 20% by weight.

In glazing materials the arrangement has, preferably on each side of the plastics molding, at least one scratch-resistant respectively antireflective coating on at least one side.

The coating, e.g. an antireflective coating, can be produced by various methods. By way of example, coating can be achieved by various vapor-deposition methods, e.g. by electron-beam processes, resistance heating, and also by plasma deposition or various sputtering methods such as high-frequency sputtering, magnetron sputtering, ion-beam sputtering, etc., ion plating by means of DC, RF, or HCD methods, reactive ion plating, etc., or chemical gas-phase deposition. It is moreover possible to apply an antireflective coating from solution: an appropriate coating solution can be produced by dispersing a metal oxide with high refractive index, for example $ZrO_2$, $TiO_2$, $Sb_2O_5$, or $WO_3$ in a silicone-based lacquer, this solution is suitable for coating plastics items, and can be hardened thermally or by a method involving UV.

There are various known methods for producing a scratch-resistant coating on plastics items. By way of example, it is possible to use epoxy-, acrylic-, polysiloxane-, or colloidal-silica-gel-based lacquers, or lacquers based on inorganic/organic systems (hybrid systems). These systems can by way of example be applied by dip-coating processes, by spincoating, by spray processes, or by flow coating. Hardening can be achieved thermally or by UV irradiation. Single- or multilayer systems can be used. The scratch-resistant coating can by way of example be applied directly or after preparation of the substrate surface with a primer. It is moreover possible to apply a scratch-resistant coating by plasma-assisted polymerization processes, e.g. by way of an $SiO_2$ plasma (CVD/PVD).

Antifogging coatings or antireflective coatings can also be produced by plasma processes. It is moreover possible to apply a scratch-resistant coating to the resultant molding by way of certain injection-molding processes, e.g. injection molding onto the reverse side of surface-treated foils. Various additives can be present in the scratch-resistant layer, examples being UV absorbers, derived by way of example from triazoles or from triazines, preferably biphenyltriazines. Organic or inorganic IR absorbers can moreover be present. These additives can be present in the scratch-resistant lacquer itself or in the primer layer.

The thickness of the scratch-resistant layer is from 1 to 20 μm, preferably from 2 to 15 μm. Below 1 μm the scratch-resistant layer is not sufficiently robust. Above 20 μm cracking in the lacquer is a relatively frequent occurrence.

The base material of the invention, described in the present invention, is preferably provided with a scratch-resistant and/or antireflective layer described above after production of the semifinished product has been completed.

For polycarbonates it is preferable to use a primer comprising UV absorber in order to improve the adhesion of the scratch-resistant lacquer. The primer can comprise other stabilizers, e.g. HALS systems (stabilizers based on sterically hindered amines), adhesion promoters, and flow aids. The respective resin can be selected from a wide variety of materials, and is described by way of example in Ullmann's Encyclopedia of Industrial Chemistry, $5^{th}$ edition, volume A18, pp. 368-426, VCH, Weinheim 1991. It is possible to use polyacrylates, polyurethanes, phenol-based systems, melamine-based systems, epoxy systems, and alkyd systems, or a mixture of these systems. The resin is mostly dissolved in suitable solvents—often in alcohols. Hardening can be achieved at room temperature or at elevated temperatures, as required by the selected resin. It is preferable to use temperatures of from 50° C. to 130° C.—often after much of the solvent has been removed during a short period at room temperature. Examples of systems obtainable commercially are SHP470, SHP470FT2050, and SHP401 from Momentive Performance Materials. Coatings of this type are described by way of example in U.S. Pat. No. 6,350,512 B1, U.S. Pat. No. 5,869,185, EP 1308084, and WO 2006/108520.

Scratch-resistant (hard-coat) lacquers are preferably composed of siloxanes, and preferably comprise UV absorber. They are preferably applied by dip-coating or flow-coating processes. Hardening is achieved at temperatures of from 50° C. to 130° C. Examples of commercially obtainable systems are AS4000, SHC5020, and AS4700 from Momentive Performance Materials. Systems of this type are described by way of example in U.S. Pat. No. 5,041,313, DE 3121385, U.S. Pat. No. 5,391,795, WO 2008/109072. Synthesis of these materials is mostly achieved by condensation of alkoxy- and/or alkylalkoxysilanes by acid catalysis or base catalysis. Nanoparticles can optionally be incorporated. Preferred solvents are alcohols such as butanol, isopropanol, methanol, ethanol, and mixtures of these.

It is possible to use single-component hybrid systems instead of primer/scratch-resistant-coating combinations. These are described by way of example in EP 0570165, or WO 2008/071363, or DE 2804283. Examples of hybrid systems obtainable commercially are PHC587, PHC587B, PHC587C, and UVHC 3000, UVHC 7000, and UVHC 7800 from Momentive Performance Materials.

In one particularly preferred process the lacquer is applied by the flow-coating process, since it leads to coated parts of high optical quality.

The flow-coating process can be achieved manually with a hose or suitable coating head, or automatically during passage through flow-coating-robot dies and optionally slot dies.

The components here can be coated either while suspended or else in an appropriate rack.

In the case of relatively large and/or 3D components, the part to be coated is placed or suspended in a suitable rack.

In the case of small parts, the coating can also be carried out manually. Here, the liquid primer solution or lacquer solution that is to form the coating is poured over the sheet, starting from the upper edge of the small part, in the longitudinal direction of said sheet, while the point at which the lacquer is applied on the sheet is simultaneously moved from left to right across the width of the sheet. The lacquered sheets are air-dried and cured in accordance with the respective manufacturer's instructions while vertically suspended from a clamp.

The thickness of the primer layer is preferably 0.05 to 8 µm, with particular preference from 0.1 to 4.0 µm.

The thickness of the outer layer is preferably from 1 to 20 µm, with particular preference from 4.0 to 12.0 µm.

In one preferred embodiment the arrangement has at least one adhesion-promoting layer (primer layer) arranged on the base layer, between the base layer and the outer layer.

In a still more preferred embodiment there is an adhesion-promoting layer, and also an outer layer, applied on both sides of the base layer.

In another preferred embodiment the outer layer b) is a coating based on polysiloxane or on polyacrylate or on polyurethane acrylate, preferably based on polysiloxane, comprising
  i. at least one UV absorber,
    where
  ii. the thickness of the outer layer is from 2 to 15 µm, with particular preference from 4.0 to 12.0 µm.

In an alternative embodiment a laser absorber is present in a primer layer or outer layer so that this becomes blackened to a greater extent during the marking process, without damage to, and weakening of, the substrate layer. The good mechanical properties of the substrate material are thus retained.

In the invention the arrangement has an IR absorber in a coextruded layer close to a surface, this permitting production of sharper outlines. The layer close to the surface here can be a layer of the substrate layer. In an embodiment to which further preference is given the arrangement has a plurality of mutually superposed coextruded layers which thus form the substrate layer, it is preferable here that the arrangement has layers with high content of IR absorber and/or of UV absorber close to a surface, the arrangement of said layers being more preferably symmetrical with respect to the sides.

In an alternative embodiment the substrate layer is a multiple-ply material made of at least one glass layer and at least one layer made of thermoplastic material; it is preferable to use aliphatic thermoplastic urethane and polyvinyl butyral as thermoplastic material here. The arrangement can have additional inorganic components a2 to a11 not only in the glass but also in the thermoplastic material, but alternatively it is possible that the arrangement has all of the components (including organic components) in the thermoplastic material.

In one preferred embodiment outer layers are applied after the laser marking process.

The invention also provides a process for the production of the compositions of the invention, and also use of said compositions, and products produced therefrom.

BRIEF DESCRIPTION OF THE DRAWINGS

FIG. 1 shows the results of experimental series 1.
FIG. 2 shows the results of experimental series 2.
FIG. 3 shows the results of experimental series 3.
FIG. 4 shows the results of experimental series 4.
FIG. 5.1 shows the results from color sample plaques composed of pellets made of mixtures 1 to 9.
FIG. 5.2 shows the results from composites 3A to 9A composed of foils and color sample plaques comprising pellets made of mixture 1.
FIG. 6.1 shows results from a sheet of 8.1 with markings from a UV laser.
FIG. 6.2 shows results from a sheet of 8.2 with markings from a UV laser.
FIG. 7.1 shows results from a sheet of 8.1 with markings from an IR laser.
FIG. 7.2 shows results from a sheet of 8.2 with markings from an IR laser.

EXAMPLES

Inventive examples are used below for a more detailed description of the invention; the determination methods described here are used for all corresponding variables in the present invention unless otherwise stated.

Materials for the Production of the Test Samples:
Component A)
  Linear bisphenol A polycarbonate having terminal groups based on phenol with melt volume rate (MVR) 6 cm/10 min, measured at 300° C. with 1.2 kg load in accordance with ISO 1033, hereinafter termed PC 1.
  Linear bisphenol A polycarbonate having terminal groups based on phenol with melt volume rate (MVR) 10 $cm^3$/10 min, measured at 300° C. with 1.2 kg load in accordance with ISO 1033, hereinafter termed PC 3.
  PC 3 also comprises an additive mixture composed of mold-release agent, heat stabilizer, and UV stabilizer. Pentaerythritol tetrastearate (CAS 115-83-3) is used as mold-release agent, triphenylphosphine (CAS 603-35-0) is used as heat stabilizer, and Tinuvin® 360 (CAS 103597-45-1) is used as UV stabilizer.
Component B)
B1) Black Pearls® 800
  Nanoscale carbon black (particle size about 17 nm) from Cabot Corp. (CAS No. 1333-86-4)
B2) Quaterrylene dye (Lumogen IR-765 from BASF SE, Germany, Cas. No. 943969-69-5)
B3) Antimony tin oxide (FMDS 874 from Sumitomo Metal Mining, Japan, Cas. No. 953384-75-3)

B4) Cesium tungstate, $Cs_{0.33}WO_3$, (YMDS 874 from Sumitomo Metal Mining, Japan, Cas. No. 1258269-41-8)

The product takes the form of a dispersion. The weight data in the examples relate to the cesium tungstate as pure substance; the solids content of cesium tungstate in the commercial YMDS 874 dispersion used here is 20% by weight. The tungstate here is not zinc-stabilized.

B5) Lanthanum hexaboride, $LaB_6$ (KHDS 872G2 from Sumitomo Metal Mining, Japan, CAS No. 949005-03-2)

The product takes the form of a powder dispersion. The weight data in the examples relate to the product KHDS 872G2; the solids content of lanthanum hexaboride in the commercial KHDS 872G2 dispersion used here is 10.0% by weight.

The following polymer compositions (hereinafter termed mixtures) were produced:

| Mixture No. | PC1 | PC3 | Component B | Content of component B |
|---|---|---|---|---|
| 1 | 100.0000 | — | — | — |
| 2 | 100.0000 | — | — | — |
| 3 | 99.9950 | — | B1 | 0.0050 |
| 4 | 99.9995 | — | B2 | 0.0005 |
| 5 | 99.9800 | — | B3 | 0.0200 |
| 6 | 99.9900 | — | B4 | 0.0100 |
| 7 | 99.9700 | — | B4 | 0.0300 |
| 8 | 99.9950 | — | B5 | 0.0050 |
| 9 | 99.9900 | — | B5 | 0.0100 |
| 10 | — | 99.9930 | B1 | 0.0070 |
| 11 | — | 99.9700 | B5 | 0.0300 |

* data in % by weight

Production of the Polymer Compositions Via Compounding:

The additives were compounded in a ZE25 twin-screw extruder from KraussMaffei Berstorff, at a barrel temperature of 300° C. and, respectively, a melt temperature of 318° C., and a rotation rate of 100 rpm, with throughput 10 kg/h, using the component quantities stated in the table above. In order to provide better mixing here, the procedure begins with manufacture of a mixture of a portion of PC 1 and of the respective component B (5% by weight mixture, based on the entire composition). This mixture is metered into the remaining quantity of PC 1 during the compounding process.

Production of the Test Samples:

The respective pellets of the mixtures 1 to 9 are dried in vacuo for 4 hours at 120° C. and then processed in an Arburg 370 injection-molding machine with an injection unit with melt temperature 300° C. and mold temperature 90° C., to give color sample plaques with the following dimensions:

60 mm×60 mm×1 mm
60 mm×60 mm×2 mm
50 mm×75 mm×4 mm

Production of Thin Foils from the Color Sample Plaques:

Color sample plaques composed of pellets from the mixtures 1 and 3 to 9 measuring 60 mm×60 mm×1 mm were pressed in a PW20 precision hydraulic press from Paul-Otto Weber GmbH, Remshalden to give flat foils of thickness about 100 µm. For this, the plaques of thickness 1 mm were plastified for 5 minutes by contact with the press plates controlled to from 320° C. to 340° C. After the plastification time, the samples were molded to give a foil of thickness about 100 µm by using a closure force of from 100 to 200 kN. Before removal of the foils from the press they were cooled to about 100° C. to 130° C. in the press with constant closure force of from 100 to 200 kN.

Production of Composites from Foils and Color Sample Plaques Comprising Pellets Made of Mixture 1

Foils comprising pellets made of mixtures 3 to 9 were then joined to color sample plaques comprising pellets made of mixture 1 in a PW20 precision hydraulic press from Paul-Otto Weber GmbH, Remshalden to give a secure composite measuring 50 mm×75 mm×4 mm. For this, the combinations of plaque and foil were plastified by contact with the press plates for 5 minutes (upper plate temperature 160° C.; lower plate temperature 150° C.). After the plastification time the combinations were joined to give a durable composite by using a closure force of 50 kN for 2 minutes.

| Composite | Foil (pellets made of mixture) | Plaque (pellets made of mixture) |
|---|---|---|
| 3-A | 3 | 1 |
| 4-A | 4 | 1 |
| 5-A | 5 | 1 |
| 6-A | 6 | 1 |
| 7-A | 7 | 1 |
| 8-A | 8 | 1 |
| 9-A | 9 | 1 |

Laser Marking of Color Sample Plaques and Composites (Laser-Inscription System from ACI Laser GmbH)

A laser-inscription system from ACI Laser GmbH, composed of a COMFORT workstation with DPL Genesis Marker 163 (8W) and MagicMarkV3 inscription software, was used for the marking experiments below. The laser beam source is composed of an excitation source (laser diode) followed by a lens system and also a resonator based on an Nd:YAG (neodymium-doped yttrium aluminum garnet) laser crystal to produce the beam. The wavelength of the resultant laser beam is 1064 nm, and the beam is focused onto the color sample plaques and, respectively, composites by way of a beam-deflector unit after passage through an F-Theta 100 lens.

The frequency and the advance rate of the laser were varied at constant pulse width (3 µs) in order to vary the processing latitude of the laser/of the laser-marking process.

The processing latitude was selected in such a way that when color sample plaques composed of pellets made from mixtures 3 to 9 are used in the process a marking is obtained over a substantial area, its darkness depending on the additives used in the matrix of the color sample plaque. When color sample plaques composed of pellets made of mixture 1 or 2 are subjected to these specific conditions there is almost no visually discernible marking.

1st Experimental Series

A grid of 8×8 markings was applied on a color sample plaque at constant pulse width (3 µs).

Frequency on the ordinate: 5.0; 7.0; 9.0; 11.0; 13.0; 15.0; 17.0; 19.0 [kHz]

Advance rate on the abscissa: 500; 600; 700; 800; 900; 1000; 1500; 2000 [mm/s]

FIG. 1 gives an indication of the results of experimental series 1.

2nd Experimental Series

A grid of 8×8 markings was applied on a color sample plaque at constant pulse width (3 µs).

Frequency on the ordinate: 3.0; 4.0; 5.0; 6.0; 7.0; 8.0; 9.0; 10.0 [kHz]

Advance rate on the abscissa: 700; 750; 800; 850; 900; 950; 1000; 1050 [mm/s]

FIG. 2 gives an indication of the results of experimental series 2.

3rd Experimental Series

A grid of 8×8 markings was applied on a color sample plaque at constant pulse width (3 µs).

Frequency on the ordinate: 7.0; 7.5; 8.0; 8.5; 9.0; 9.5; 10.0; 10.5 [kHz]

Advance rate on the abscissa: 700; 725; 750; 775; 800; 825; 850; 875 [mm/s]

FIG. 3 provides an indication of the results of experimental series 3.

4th Experimental Series

A grid of 4×4 markings was applied on a color sample plaque at constant pulse width (3 µs).

Frequency on the ordinate: 7.0; 7.5; 8.0; 8.5 [kHz]

Advance rate on the abscissa: 700; 725; 750; 775 [mm/s]

FIG. 4 gives an indication of the results of experimental series 4.

From experimental series 1 to 4 it is clear that the additional substances in the color sample plaques composed of pellets made of mixtures 3 to 9 (termed examples 3 to 9 in the figures) permit better marking than in color sample plaques composed of pellets made of the mixtures 1 and 2 (termed examples 1 and 2 in the figures) without additional substances. Under the prevailing processing conditions, color sample plaques composed of pellets made of the mixtures 3, 8, and 9 have the greatest contrast.

5th Experimental Series

An assembly of 3 linear markings was applied at a width of 3 mm and at a separation of 3 cm on color sample plaques and composites (50 mm×75 mm×4 mm), at constant pulse width (3 µs).

Frequency: 8.0 [kHz]

Advance rate: 725 [mm/s]

FIG. 5.1 gives an indication of the results from color sample plaques composed of pellets made of mixtures 1 to 9.

From experimental series 5.1 it is clear that the additional substances in the color sample plaques composed of pellets made of mixtures 3 to 9 (termed examples 3 to 9 in the figures) permit better marking than in color sample plaques composed of pellets made of the mixtures 1 and 2 (termed examples 1 and 2 in the figures) without additional substances. Under the prevailing processing conditions, color sample plaques composed of pellets made of the mixtures 3, 8, and 9 have the greatest contrast.

FIG. 5.2 gives an indication of the results from composites 3A to 9A composed of foils and color sample plaques comprising pellets made of mixture 1.

Experimental series 5.2 shows clearly that marking of a thin foil of thickness about 100 µm composed of the pellets of the mixtures 3 to 9 is possible in the composites. Composites 3A, 8A, and 9A obtained under the prevailing processing conditions have the greatest contrast.

6. Determination of Optical Properties

A square marking with edge length 10 mm was applied on color sample plaques composed of pellets of the mixtures 1 to 9 (50 mm×75 mm×4 mm) at constant pulse with (3 µs).

Frequency: 8.0 [kHz]

Advance rate: 725 [mm/s]

The color is determined in transmission by a Lambda 900 spectrophotometer from Perkin Elmer with photometer sphere by a method based on ASTM E1348, using the weighting factors and formulae described in ASTM E308.

The CIELAB color coordinates L*, a*, b* are calculated for illuminant D 65 with 10° standard observer.

The transmission measurements (light transmittance; Ty) were made in a Lambda 900 spectrophotometer from Perkin Elmer with photometer sphere in accordance with ISO 13468-2 (i.e. determination of total transmittance via measurement of diffuse transmission and direct transmittance). Optical parameters are determined with a 30 mm² stop to provide adjustment appropriate to the measurement unit and to the field of measurement.

The optical properties of the marked regions were determined in comparison with unmarked regions on the color sample plaques. The results are collated in the table below.

| Color sample plaque composed of pellets made of mixture | Color sample plaque without marking | | | | Marking on color sample plaque | | | |
|---|---|---|---|---|---|---|---|---|
| | L* | a* | b* | Ty [%] | L* | a* | b* | Ty [%] |
| 1 | 86.4 | −0.39 | 0.58 | 68.8 | 73.0 | −0.05 | 1.29 | 45.17 |
| 2 | 92.3 | −0.36 | 1.15 | 81.4 | 82.8 | 0.01 | 2.8 | 61.8 |
| 4 | 79.0 | −0.25 | 1.48 | 54.9 | 69.9 | 0.58 | 7.5 | 40.6 |
| 5 | 86.2 | −2.71 | 0.66 | 68.4 | 78.5 | −2.25 | 2.60 | 54.1 |
| 6 | 77.8 | −0.44 | 1.09 | 52.8 | 78.9 | 0.10 | 3.83 | 54.7 |
| 7 | 91.3 | −1.36 | 1.24 | 79.1 | 58.2 | −0.12 | 3.48 | 26.1 |
| 8 | 77.0 | −0.70 | 1.88 | 51.5 | 40.5 | 1.86 | 8.96 | 11.9 |
| 9 | 85.6 | −1.56 | 2.73 | 67.2 | 31.4 | 2.34 | 10.09 | 6.8 |

7. Effect of the Marking on the Toughness of the Color Sample Plaque with Additional Substance An assembly of 3 linear markings was applied at a width of 3 mm and at a separation of 2 cm on color sample plaques composed of pellets of the mixtures 1 to 9 (60 mm×60 mm×2 mm), at constant pulse width (3 µs).

Frequency: 8.0 [kHz]

Advance rate: 725 [mm/s]

Puncture impact tests in accordance with DIN EN ISO 6603-2 were carried out on the color sample plaques thus prepared. The fracture behavior of the color sample plaques and the total energy absorbed by the plaques were determined on impact of the drop weight onto the marked side and onto the unmarked side, and are shown in the table below. As can be seen, the marking of the color sample plaques has no significant effect on the fracture behavior of, or the energy absorbed by, the color sample plaques.

| Color sample plaques composed of pellets made of mixture | Color sample plaque without marking | | Puncture impact on the marked frontal side | | Puncture impact on the unmarked reverse side | |
|---|---|---|---|---|---|---|
| | Optical assessment | Total energy [J] | Optical assessment | Total energy [J] | Optical assessment | Total energy [J] |
| 1 | 2.1 | 62.3 | 2.0 | 59.4 | 2.6 | 51.8 |
| 2 | 2.0 | 65.5 | 2.2 | 54.6 | 2.1 | 46.9 |
| 3 | 1.9 | 65.5 | 2.3 | 56.3 | 2.0 | 38.4 |
| 4 | 2.1 | 62.1 | 2.7 | 53.0 | 2.2 | 42.8 |
| 5 | 2.0 | 65.0 | 2.3 | 52.0 | 2.1 | 40.7 |
| 6 | 2.4 | 65.9 | 2.2 | 55.1 | 2.3 | 46.7 |

-continued

| Color sample plaques composed of | Color sample plaque without marking | | Puncture impact on the marked frontal side | | Puncture impact on the unmarked reverse side | |
|---|---|---|---|---|---|---|
| pellets made of mixture | Optical assessment | Total energy [J] | Optical assessment | Total energy [J] | Optical assessment | Total energy [J] |
| 7 | 2.1 | 61.1 | 2.5 | 54.8 | 2.3 | 46.4 |
| 8 | 2.0 | 64.9 | 2.5 | 49.4 | 2.1 | 36.3 |
| 9 | 2.0 | 65.4 | 2.0 | 34.4 | 2.0 | 33.1 |

The optical assessment of the samples after puncture impact was carried out in accordance with the following system.

| Assessment | Assessment criterion |
|---|---|
| 1 | No crack outside of the impact area |
| 2 | Radial/straight crack: stable propagation; not extending to the periphery on one or both sides of the impact area |
| 3 | Tangential/curved crack; maximal circumferential extent up to 90°; not extending to the periphery on one or both sides of the impact area |
| 4 | Tangential/curved crack; circumferential extent more than 90°; not extending to the periphery on one or both sides of the impact area |
| 5 | Impact removes compact fragments larger than the impact area |
| 6 | Sample breaks into a plurality of fragments |

8. Production of Bisphenol a Polycarbonate Sheets of Thickness 15 mm with a Modified Coextruded Layer:

Polycarbonate sheets of thickness 15 mm were manufactured using PC 1 (linear bisphenol A polycarbonate from Bayer AG, Leverkusen with melt flow index (MFR) 6 $cm^3/10$ min in accordance with ISO 1133 at 300° C. with 1.2 kg load) as base material for the extrusion process. During the production process the mixture 10 and, respectively, the mixture 11 was introduced by way of a coextruder, thus applying an external skin based on the mixture 10 and, respectively, 11 on the lower and upper side of the polycarbonate sheet composed of PC 1.

8.1 Bisphenol A polycarbonate sheet of thickness 15 mm with a coextruded layer of thickness 60 μm applied on both sides based on mixture 10 comprising 70 ppm of Black Pearls 800.

8.2 Bisphenol A polycarbonate sheet of thickness 15 mm with a coextruded layer of thickness 60 μm applied on both sides based on mixture 11 comprising 0.03% of KHDS 872-G2.

9. Markings using a UV laser

A TruMark 6350 laser-marking system from Trumpf based on an Nd:$YVO_4$ laser medium emitting a laser wavelength of 355 nm was used for the marking of the sheets of 8.1 and 8.2. The focus diameter used with a lens with focal length 260 mm was 57 μm. Maximal power was 5 W at a pulse frequency of 33 kHz. The markings were made with a pulse width of 10 ns.

FIG. 6.1 gives an impression of results from a sheet of 8.1 with markings from a UV laser, FIG. 6.2 gives an impression of results from a sheet of 8.2 with markings from a UV laser.

A UV laser can achieve fully satisfactory marking of the coextruded layers of 8.1 and 8.2. Homogeneous, high-contrast markings are obtained on the bisphenol A polycarbonate sheets.

10. Markings Using a DPL Genesis Marker 163 (SW) IR Laser

A laser-inscription system from ACI Laser GmbH, composed of a COMFORT workstation with DPL Genesis Marker 163 (8W) and MagicMarkV3 inscription software, was used for the marking experiments below. The laser beam source is composed of an excitation source (laser diode) followed by a lens system and also a resonator based on an Nd:YAG (neodymium-doped yttrium aluminum garnet) laser crystal to produce the beam. The wavelength of the resultant laser beam is 1064 nm, and the beam is focused onto the sheets of 8.1 and 8.2 by way of a beam-deflector unit after passage through an F-Theta 100 lens.

The advance rate of the laser was 500 mm/s, and the pulse frequency was set to 8 kHz. The pulse width was 3 μs. The distance between the individual lines of which the resultant marking is composed was 0.1 mm (in each case on the left-hand side of the figure) or else 0.05 mm (in each case on the right-hand side in the figure).

FIG. 7.1 gives an indication of results from a sheet of 8.1 with markings from an IR laser.

FIG. 7.2 gives an indication of results from a sheet of 8.2 with markings from an IR laser.

Homogeneous high-contrast markings are obtained under the prevailing conditions in example 10 here both for sheets of example 8.1 and for sheets of example 8.2.

What is claimed is:
1. A plastics molding comprising
  a) at least one substrate layer comprising at least one thermoplastic polymer, where the substrate layer comprises a base layer and, adjacent thereto, a coextruded layer, and where the coextruded layer comprises at least one IR absorber,
  b) optionally at least one outer layer on at least one side of the substrate layer,
  c) optionally a primer or intermediate layer between the layers a) and b),
wherein the plastics molding comprises, in the substrate layer, markings which reduce the transparency of the molding in the wavelength range from 380 to 780 nm in the marked region.

2. The plastics molding as claimed in claim 1, wherein the coextruded layer comprises at least one UV absorber.

3. The plastics molding as claimed in claim 1, wherein an arrangement of the markings is uniform/homogeneous on the area of the plastics molding.

4. The plastics molding as claimed in claim 1, wherein the markings are in the coextruded layer.

5. The plastics molding as claimed in claim 1, wherein the markings do not leave any uncovered transparent areas of average diameter greater than 250 mm.

6. The plastics molding as claimed in claim 1, wherein the average diameter of the markings, irrespective of the shape thereof, is at least 5 mm and less than 300 mm.

7. The plastics molding as claimed in claim 1, wherein the markings are linear and horizontally oriented with a line width of from 1.5 mm to 15 mm, with regular separation of from 1.5 cm to 10.0 cm, where the extent of coverage of the surface of the molding is from 4% to 25%.

8. The plastics molding as claimed in claim 1, wherein the markings are linear and vertically oriented with a line width of from 3 mm to 20 mm, with regular separation of from 4 cm to 20 cm, where the extent of coverage of the surface of the molding is from 2% to 25%.

9. The plastics molding as claimed in claim 1, wherein the markings are not linear, and the extent of coverage of the surface of the molding is from 5% to 40%.

10. The plastics molding as claimed in claim 1, wherein the transparency (light transmittance) of the markings is less than 5.0%.

11. The plastics molding as claimed in claim 1, wherein the contrast, between a marked and an unmarked location defined as quotient calculated from the difference between the light transmittance of the unmarked and the marked location as dividend and from the sum of light transmittance of the marked and the unmarked location as divisor, is at least 90%.

12. The plastics molding as claimed in claim 1, wherein the IR absorber in the coextruded layer is selected from the group consisting of lanthanum borides and carbon black.

13. The plastics molding as claimed in claim 1, wherein the thermoplastic polymer of the substrate layer is polycarbonate.

14. The plastics molding as claimed in claim 1, wherein the markings are introduced by an Nd:YAG laser with 1064 nm wavelength, or by a UV (ultraviolet) laser (Nd:YVO$_4$ laser) with 355 nm wavelength.

15. A method for the production of bird-protected glazing comprising utilizing the plastics moldings as claimed in claim 1.

16. The plastics molding as claimed in claim 1, wherein the light transmittance of the unmarked regions is 15%-95% in the wavelength range from 380 nm to 780 nm.

* * * * *